United States Patent [19]

Epolite et al.

[11] Patent Number: 5,572,683
[45] Date of Patent: Nov. 5, 1996

[54] FIRMWARE SELECTABLE ADDRESS LOCATION AND SIZE FOR CIS BYTE AND ABILITY TO CHOOSE BETWEEN COMMON MEMORY MODE AND AUDIO MODE BY USING TWO EXTERNAL PINS

[75] Inventors: Carl J. Epolite, Phoenix, Ariz.; Michael Gley, Sacramento; Nels Satterlund, Loomis, both of Calif.

[73] Assignee: Intel Corporation, Santa Clara, Calif.

[21] Appl. No.: 492,476

[22] Filed: Jun. 22, 1995

Related U.S. Application Data

[63] Continuation of Ser. No. 260,057, Jun. 15, 1994, abandoned.

[51] Int. Cl.$^6$ .............................. G06F 13/00; G06F 12/02
[52] U.S. Cl. .................. 395/284; 395/828; 395/830; 395/834; 395/882; 395/497.03; 364/245.2; 364/927.92; 364/927.98; 364/927.99; 364/958.5; 364/959; 364/958.2; 364/961; 364/DIG. 2
[58] Field of Search ........................... 395/427, 325, 395/800, 200.1, 828, 830, 834, 843, 846, 872, 882, 883, 892, 893, 284; 364/DIG. 1, DIG. 2

[56] References Cited

U.S. PATENT DOCUMENTS

| | | | |
|---|---|---|---|
| 4,807,282 | 2/1989 | Kazan et al. | 395/497.03 |
| 4,964,038 | 10/1990 | Louis et al. | 395/829 |
| 4,981,371 | 1/1991 | Gurak et al. | 380/49 |
| 4,991,085 | 2/1991 | Pleva et al. | 364/200 |
| 5,101,498 | 3/1992 | Ehlig et al. | 395/800 |
| 5,129,069 | 7/1992 | Helm et al. | 379/284 |
| 5,243,700 | 9/1993 | Larsen et al. | 395/275 |
| 5,297,231 | 3/1994 | Miller | 395/2.1 |
| 5,388,248 | 2/1995 | Robinson et al. | 395/425 |
| 5,436,621 | 6/1995 | Macko et al. | 340/825.44 |
| 5,448,710 | 9/1995 | Liu | 395/497.03 |

OTHER PUBLICATIONS

PCMCIA PC card standard release 2.01.

Primary Examiner—Meng-Ai T. An
Attorney, Agent, or Firm—Blakely, Sokoloff, Taylor & Zafman

[57] ABSTRACT

An interface card has an interface logic block for interfacing a peripheral device with a computer host and for selecting either a common memory mode or an audio mode where the computer host can enable or disable a common memory read or write operation in the common memory mode. In the common memory mode, the computer host can choose to read card information service (CIS) bytes internally or externally. The interface logic block has, (a) a first external pin used either for a common memory chip select (CMCS) signal in the common memory mode or for an audio-in (AudIn) signal for the audio mode, (b) a second external pin used either for a common memory write (CMWR) signal in the common memory mode or for an audio-out (AudOut) signal in the audio mode, (c) a plurality of registers, (d) a logic circuit coupled to the registers, and (e) a microcontroller which can enable or disable the common memory write operation. The registers further include a configuration option register (COR), a card configuration and status register (CCSR), a pin replacement register organization (PRRO), a memory card address register, a memory card data register and an interface configuration register (ICR). Attribute memory range select bits in the ICR allow firmware selectable attribute memory locations of CIS bytes, the COR, CCSR and PRRO.

22 Claims, 6 Drawing Sheets

FIG. 6

| bit 7 | bit 6 | bit 5 | bit 4 | bit 3 | bit 2 | bit 1 | bit 0 |
|---|---|---|---|---|---|---|---|
| SRST | LVLREQ | CE | HCMAEn | UAMEn | X | CS1 | CS0 |
| 40 | 41 | 42 | 43 | 44 | | 45 | 46 |

FIG. 7

| bit 7 | bit 6 | bit 5 | bit 4 | bit 3 | bit 2 | bit 1 | bit 0 |
|---|---|---|---|---|---|---|---|
| CHGD | SIGCHG | X | RNGINDEn | AUDIOEN | PD | INTR | X |
| 51 | 52 | | 53 | 54 | 55 | 56 | |

FIG. 8 PRIOR ART

| bit 7 | bit 6 | bit 5 | bit 4 | bit 3 | bit 2 | bit 1 | bit 0 |
|---|---|---|---|---|---|---|---|
| DB7 | DB6 | DB5 | DB4 | B3 | B2 | RDY/BSY# | B0 |
| 61 | 62 | 63 | 64 | 65 | 66 | 67 | 48 |

FIG. 9

| bit 15 | bit 14 | bit 13 | bit 12 | bit 11 | bit 10 | bit 9 | bit 8 | bit 7 | bit 6 | bit 5 | bit 4 | bit 3 | bit 2 | bit 1 | bit 0 |
|---|---|---|---|---|---|---|---|---|---|---|---|---|---|---|---|
| 0 | 0 | 0 | 0 | 0 | 0 | ADD9 | ADD8 | ADD7 | ADD6 | ADD5 | ADD4 | ADD3 | ADD2 | ADD1 | ADD0 |

70

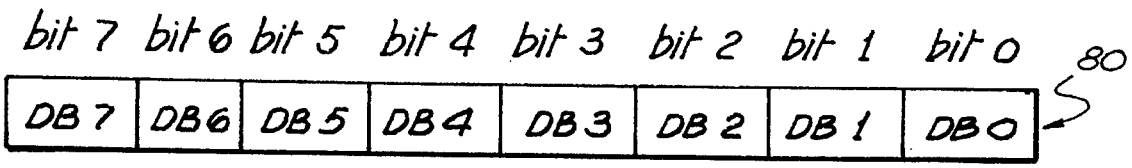
FIG. 10
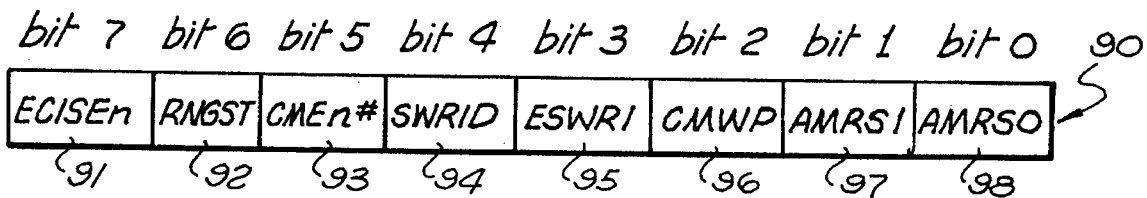
FIG. 11
FIG. 13
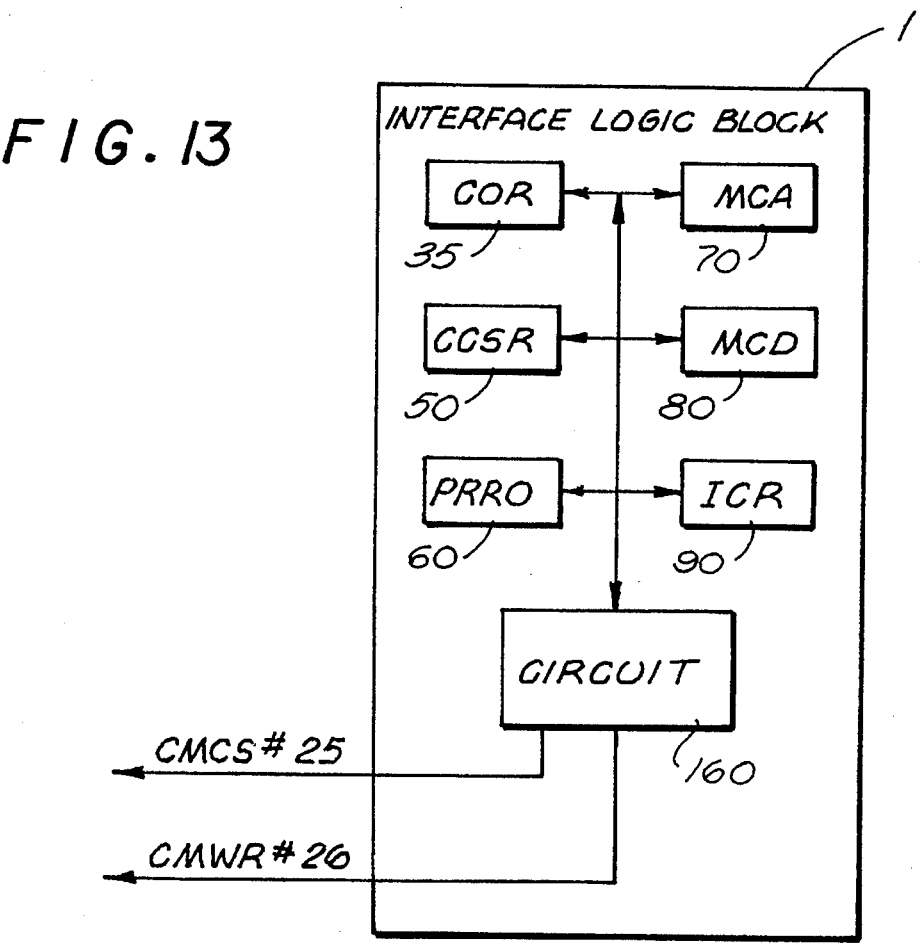

5,572,683

FIRMWARE SELECTABLE ADDRESS LOCATION AND SIZE FOR CIS BYTE AND ABILITY TO CHOOSE BETWEEN COMMON MEMORY MODE AND AUDIO MODE BY USING TWO EXTERNAL PINS

This is a continuation of application Ser. No. 08/260,057 filed Jun. 15, 1994, now abandoned.

BACKGROUND OF THE INVENTION

I. Field of the Invention

The present invention relates to the field of computer firmware, interface cards, PCMCIA cards and the like.

II. Description of Related Art:

In a computer system, interface cards are provided between data communication devices and data processing terminal devices to ensure proper communication between the devices. An interface card may reside between a system bus and user interface devices such as a keyboard, a mouse or other pointing devices and a display of the computer system. In another instance, an interface card may reside between the system bus and a modem, another computer, a network, or an instrument for measuring various parameters in a laboratory or a manufacturing facility.

Various interface standards are used in the industry to standardize methods of communication and to ensure uniformity. One is the PCMCIA PC card standard whose release # 2.01 is enclosed herewith. The PCMCIA specification defines the number of pins, the location of the pins and their functions. The present invention incorporates some of the standard PCMCIA signals.

Card information structure (CIS) bytes in an interface card contain information about the card. A computer host reads the CIS bytes to find out various information including, but not limited to, whether it is an I/O card, a memory card or a modem card, and who the manufacturer is. Prior art computer systems have provided either an internal CIS read or an external CIS read, but have not provided the capability to choose one or the other in a given system. In an internal CIS read, the CIS bytes typically reside in a chip where a microcontroller for the interface card resides. In an external CIS read, the CIS bytes are in another chip such as a memory chip.

In addition, prior art computer systems have fixed location and size of CIS bytes. For example, CIS bytes may be fixed to 0–100 h address locations. Also, PCMCIA registers such as configuration option register, card configuration and status register and pin replacement register organization have fixed address locations. If the CIS bytes need to be upgraded, and the new CIS bytes occupy more bytes than the original CIS bytes, the chip containing the CIS bytes needs to be replaced.

To overcome the drawbacks of the prior art interface cards, the present invention provides a firmware selectable location and size for CIS bytes and the ability to choose an internal or external CIS read. The present invention also allows a system designer to choose between a common memory mode for using the interface card as a memory card and an audio mode for using the interface card as an I/O card, utilizing only two external pins.

SUMMARY OF THE INVENTION

The present invention provides an interface card having an interface logic block for interfacing a peripheral device with a computer host and for selecting either a common memory mode or an audio mode where the computer host can enable or disable a common memory read or write operation in the common memory mode. In the common memory mode, the computer host can choose to read card information structure (CIS) bytes internally or externally. The present invention further provides a firmware selectable location and size for CIS bytes and firmware selectable addresses for registers.

The interface logic block has, but is not limited to, (a) a first external pin used either for a common memory chip select (CMCS) signal in the common memory mode or for an audio-in (AudIn) signal for the audio mode, (b) a second external pin used either for a common memory write (CMWR) signal in the common memory mode or for an audio-out (AudOut) signal in the audio mode, (c) a plurality of registers, (d) a logic circuit coupled to the registers, and (e) a microcontroller which can enable or disable the common memory write operation.

The registers of the interface logic block include, but are not limited to, a configuration option register (COR), a card configuration and status register (CCSR), a pin replacement register organization (PRRO), a memory card address (MCA) register, a memory card data (MCD) register and an interface configuration register (ICR).

The COR has, among other bits, a card enable bit for allowing an I/O access into the interface card, a host common memory access enable bit for the computer host to enable or disable the common memory read or write operation, and a universal asynchronous receiver/transmitter (UART) attribute memory enable bit for the computer host to access UART registers in attribute memory space.

The ICR has, among other bits, an external CIS read enable bit for allowing an external CIS read, a common memory enable bit for enabling the common memory mode, a common memory write protect bit for prohibiting the common memory write operation, and one or more attribute memory range select bits for selecting attribute memory locations of the CIS bytes, COR, CCSR and PRRO.

The logic circuit includes, but is not limited to, (a) tri state drivers, (b) a first pad unit having an output for either the CMCS or AudIn signal, (c) a second pad unit having an output for either the CMWR or AudOut signal, (d) a transistor for pulling the output of the first pad to Vcc, (e) a second logic circuit for enabling or disabling a first one of the tri state drivers, the second logic circuit having the common memory enable bit, the card enable bit and an audio enable bit as inputs, and (f) a third logic circuit for determining whether the attribute memory select bits are greater than upper data address bits.

BRIEF DESCRIPTION OF THE DRAWINGS

FIG. 6 presents a configuration option register (COR) according to the present invention.

FIG. 7 presents a card configuration and status register (CCSR) according to the present invention.

FIG. 8 presents a prior art pin replacement register organization (PRRO).

FIG. 9 presents a memory card address (MCA) register according to the present invention.

FIG. 10 presents a memory card data (MCD) register according to the present invention.

FIG. 11 presents an interface configuration register (ICR) according to the present invention.

FIG. 13 presents a block diagram of the components in an interface logic block according to the present invention.

DETAILED DESCRIPTION OF THE INVENTION

In the following description, numerous specific details are set forth to provide a thorough understanding of the present invention. It will be obvious, however, to one skilled in the art that the present invention may be practiced without these specific details. In other instances, well-known circuits, registers, structures and techniques have not been shown in detail not to unnecessarily obscure the present invention.

I. Computer System with an Interface Device

Figure 1:
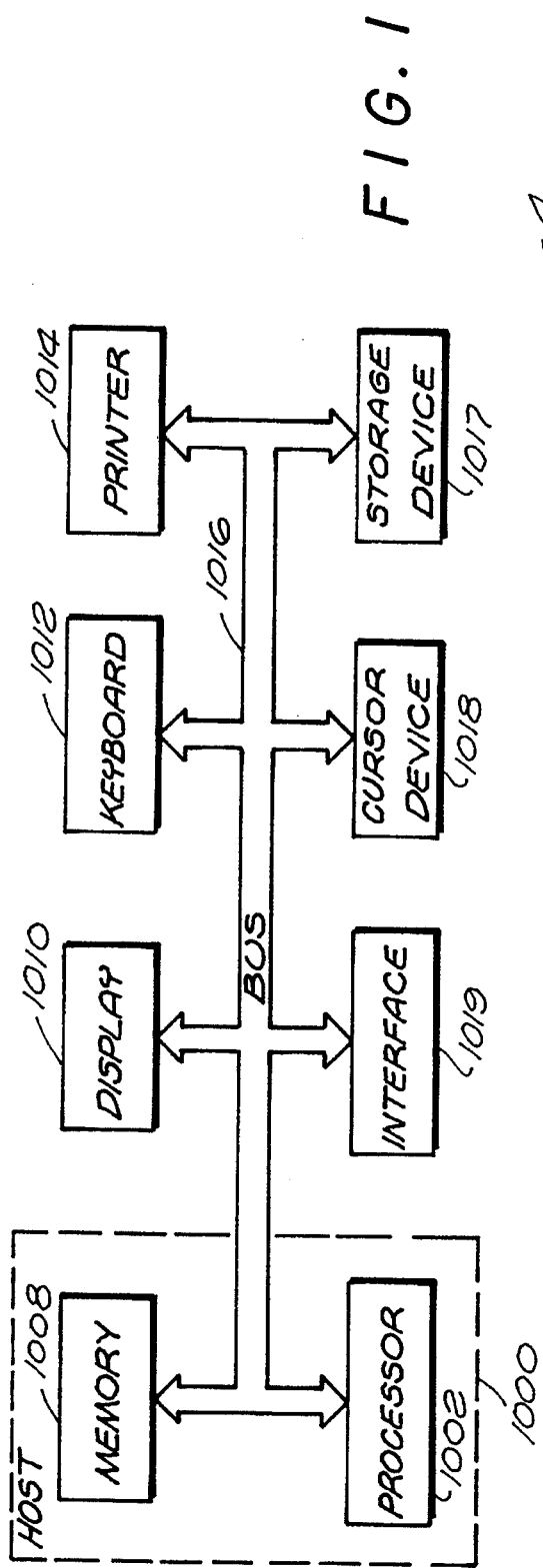
FIG. 1 is a computer system which may utilize an interface device of the present invention.

Referring first to FIG. 1, a computer system may utilize an interface device that implements the present invention. A computer host (hereinafter a host) 1000 includes a memory 1008 and a central processor 1002. These elements are those typically found in most general purpose computers and almost all special purpose computers. In fact, these devices contained within host 1000 are intended to be representative of the broad category of data processors and memory. Many commercially available computers having differing capabilities may be utilized which incorporate the present invention.

A system bus 1016 is provided for communicating information. A display device 1010 utilized with the computer system of the present invention may be a liquid crystal device, cathode ray tube or other display device suitable for creating graphic images and/or alphanumeric characters recognizable to a user. The computer system may also include an alphanumeric input device 1012 including alphanumeric and function keys coupled to bus 1016 for communicating information and command selections to central processor 1002, and a cursor control device 1018 coupled to bus 1016 for communicating user input information and command selections to central processor 1002 based on a user's hand movement. Cursor control device 1018 allows a network user to dynamically signal the two-dimensional movement of the visual symbol (pointer) on a display screen of display device 1010. Many implementations of cursor control device 1018 are known in the art, including a track ball, mouse, joystick or special keys on the alphanumeric input device 1012, all capable of signaling movement in a given direction or manner of displacement.

The computer system of FIG. 1 also includes an interface device 1019 coupled to bus 1016 for communicating information to and from the computer system. Interface device 1019 may be coupled to a communication modem, a network system, other memory devices, other computers, etc. Also available for interface with the computer system of the present invention is a data storage device 1017 such as a magnetic disk or optical disk drive, which may be communicatively coupled with bus 1016, for storing data and instructions. The computer system of FIG. 1 may also include a printer 1014 for outputting data.

The preferred embodiment of the present invention is intended for use in a PCMCIA/ISA bus interface unit. The present invention may, however, be implemented in other interface systems.

II. Interface Card in a Common Memory Mode or Audio Mode (1) Overview

Figure 2:
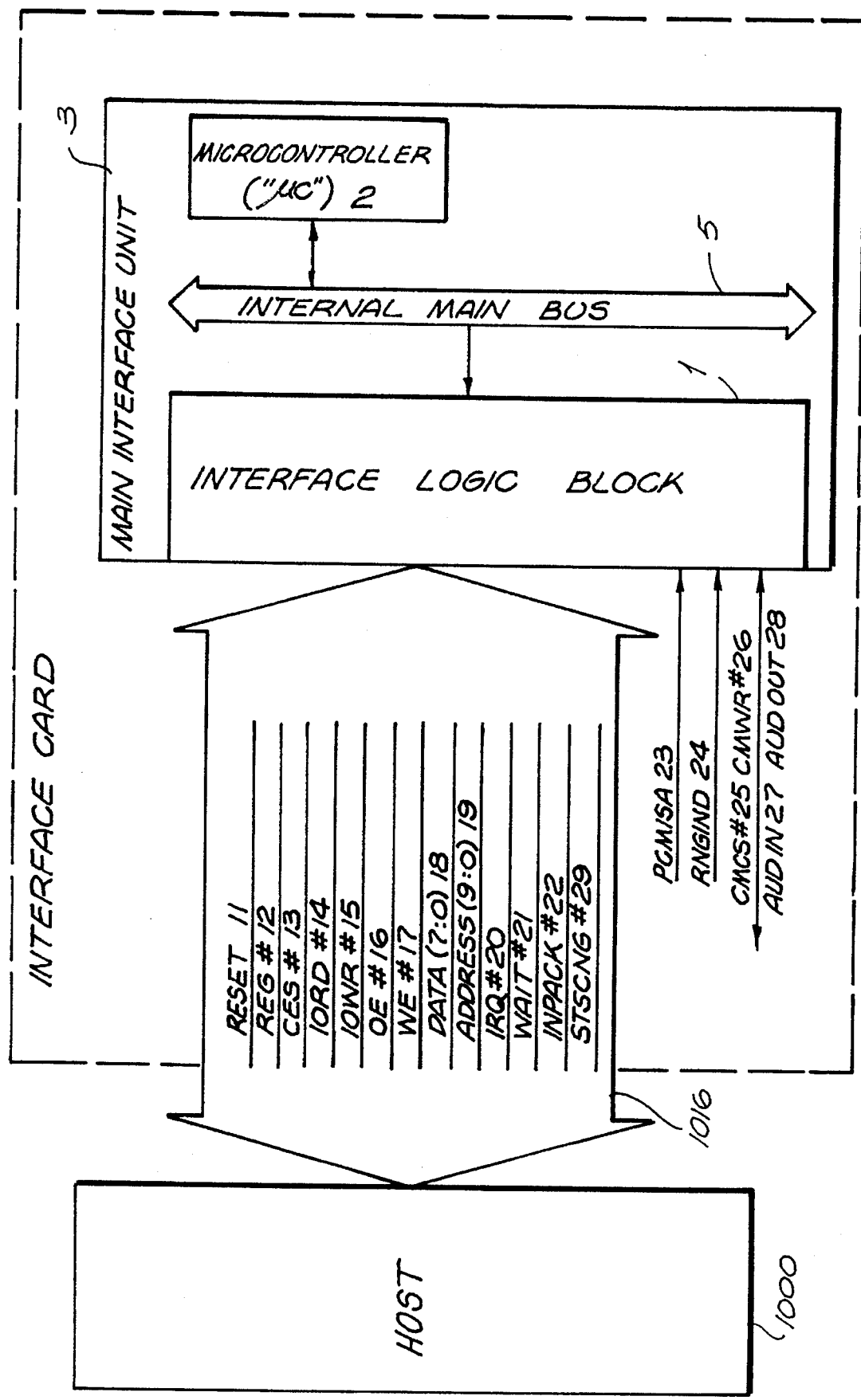
FIG. 2 presents a computer host and an interface card having an interface logic block according to the present invention wherein the interface card can be used in a common memory mode or an audio mode.

FIG. 2 presents a block diagram of host 1000 coupled with an interface card 4. Interface card 4 typically is a printed circuit board that includes many different components. One component is a main interface unit 3. In the preferred embodiment of the present invention, main interface unit 3 is a single semiconductor chip. Main interface unit 3 includes a microcontroller 2 and an internal main bus 5. Internal main bas 5 is called F-bus in the preferred embodiment. Internal main bus 5 is used for communicating information between microcontroller 2 and various components on main interface unit 3. Main interface unit 3 further includes an interface logic block 1. Main interface unit 3 also has other peripherals including, but not limited to, flash memories, program memories and digital signal processing units (not shown).

Interface logic block 1 is used as an interface between host 1000 and interface card 4. Interface logic block 1 incorporates some of the standard PCMCIA signals defined by the PCMCIA Rev. 2.01 specification enclosed herewith. These signals include RESET 11, REG# 12, CEi# 13, IORD# 14, IOWR# 15, OE# 16, WE# 17, data (7:0) 18, Address (9:0) 19, IRQ# 20, WAIT# 21, INPACK# 22 and STSCHG# 29. The PCMCIA signals are described here only briefly since they are described in detail in the PCMCIA Rev. 2.01 Spec.

The notation "#" in this description means that a signal with the notation "#" is inverted, i.e., a signal is active (or asserted) when the signal is low (or a logic 0), and the signal is inactive (or deasserted) when the signal is high (or a logic 1). For example, REG# 12 is active when REG# 12 is low (0). It should be noted that although some of the signals are inverted in the preferred embodiment of the present invention, each signal can be either inverted or non-inverted.

Continuing to refer to FIG. 2, RESET 11 is used to reset an entire card such as interface card 4. REG# 12 and CEi# 13 are control signals for determining whether interface card 4 is being accessed and the type of access mode used. REG# 12 is used for selecting registers and enabling I/O. CEi# 13 is used to enable interface card 4. If CEi# 13 is low and REG# 12 is high, then interface card 4 is enabled and is ready for a common memory access. If CEi# 13 and REG# 12 are both low, then interface card 4 is enabled and is ready for an I/O or attribute memory access. IORD# 14 is used for an I/O read, and IOWR# 15 is used for an I/O write. OE# 16 is an output enable signal. WE# 17 is a write enable signal. IORD# 14 and IOWR# 15 are used for an I/O access. OE# 16 and WE# 17 are used for an attribute memory access including accessing of a universal asynchronous receiver/transmitter (UART) emulator.

Other standard PCMCIA signals include data signals and address signals such as an 8-bit data 18 and a 10-bit address 19. IRQ# 20 is an interrupt signal. WAIT# 21 is a wait signal. WAIT# 21 is asserted if host 1000 or interface logic block 1 is busy. INPACK# 22 is an input acknowledge signal. During an I/O read, if a register is present at a given address, INPACK# 22 is asserted acknowledging that the register at the given address exists. STSCHG# 29 indicates whether there has been a card status change.

Continuing to refer to FIG. 2, PCMISA 23 is used to choose between a PCMCIA bus and an ISA bus. RngInd 24 is a ring indicate signal. RngInd 24 is asserted if a ring is received. CMCS# 25 is a common memory chip select signal. CMWR# 26 is a common memory write signal. These signals are generated from interface logic block 1. AudIn 27 is an audio-in signal. AudOut 28 is an audio-out signal.

In the preferred embodiment of the present invention, one pin is assigned to either CMCS# 25 or AudIn 27, and another pin is assigned to either CMWR# 26 or AudOut 28 so that CMCS# 25 and AudIn 27 share a pin, and CMWR# 26 and AudOut 28 share another pin. In another embodiment, CMCS# 25 and AudOut 28 may share a pin, and CMWR# 26 and AudIn 27 may share another pin. Yet, in another embodiment, CMCS# 25, CMWR# 26, AudIn 27 and AudOut 28 each may have a separate pin. However, CMCS# 25 may not share a pin with CMWR# 26, and AudIn 27 may not share a pin with AudOut 28.

All the signals shown in FIG. 2 are coupled to interface logic block 1 so that if microcontroller 2 needs any of the signals shown in FIG. 2, microcontroller 2 obtains these signals from interface logic block 1 through internal main bus 5. Interface logic block 1 includes, but is not limited to, various registers, logic circuits and a UART emulator.

Most of the components in main interface unit 3 are synchronous. To operate various components synchronously, microcontroller 2 provides a clock unit (not shown). The clock unit sends out clock pulses, and all the latches operate based upon the clock pulses so that the timing is correct between all the components.

Some registers in interface logic block 1 are asynchronous. These registers include a configuration option register (COR), a card configuration and status register (CCSR) and an interface configuration register (ICR). These registers will be discussed in detail later. During a power-down mode, because the clock unit stops sending the clock pulses, the various components in main interface unit 3 cannot follow the clock pulses. Because the COR, CCSR and ICR need to be accessed at all times whether interface card 4 is in a power-down or power-up mode, these registers operate asynchronously. The registers use master-slave latches in which, for example, if a write signal is sent to interface logic block 1, the write signal is used as a clock signal, and the data is latched when the write signal arrives. Thus, these registers operate asynchronously with respect to time other components in main interface unit 3.

Although a UART emulator is typically addressable in I/O memory space, in the present invention, the UART emulator is addressable both in I/O memory space and attribute memory space. When an interface card is plugged in to communicate with host 1000, host 1000 treats the card as a memory card until a card configuration manager software running on host 1000 considers the card to be an I/O card. While interface card 4 remains as a memory card, and not configured as an I/O card, the UART emulator is addressable in attribute memory space using OE# 16 and WE# 17. This allows a programmer to reprogram some of the flash memory or program memory of main interface unit 3. It should be noted that the flash memory or program memory of the common memory is not erased or changed. In the present invention, during a firmware upgrade, to address the UART emulator in attribute memory space, host 1000 writes data into some registers in interface logic block 1, microcontroller 2 reads data in interface logic block 1, and writes the data into the flash memory in main interface unlit 3.

Figure 3:
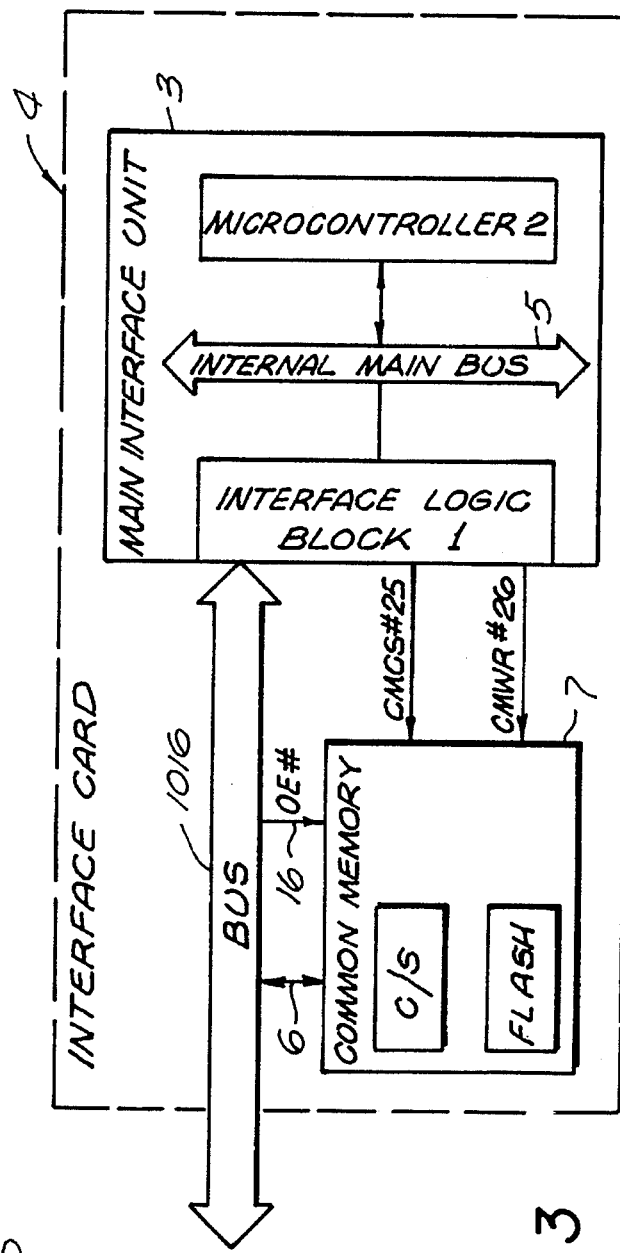
FIG. 3 presents the interface card of FIG. 2 during a common memory read operation, a common memory write operation or an external card information structure (CIS) read operation.
Figure 4:
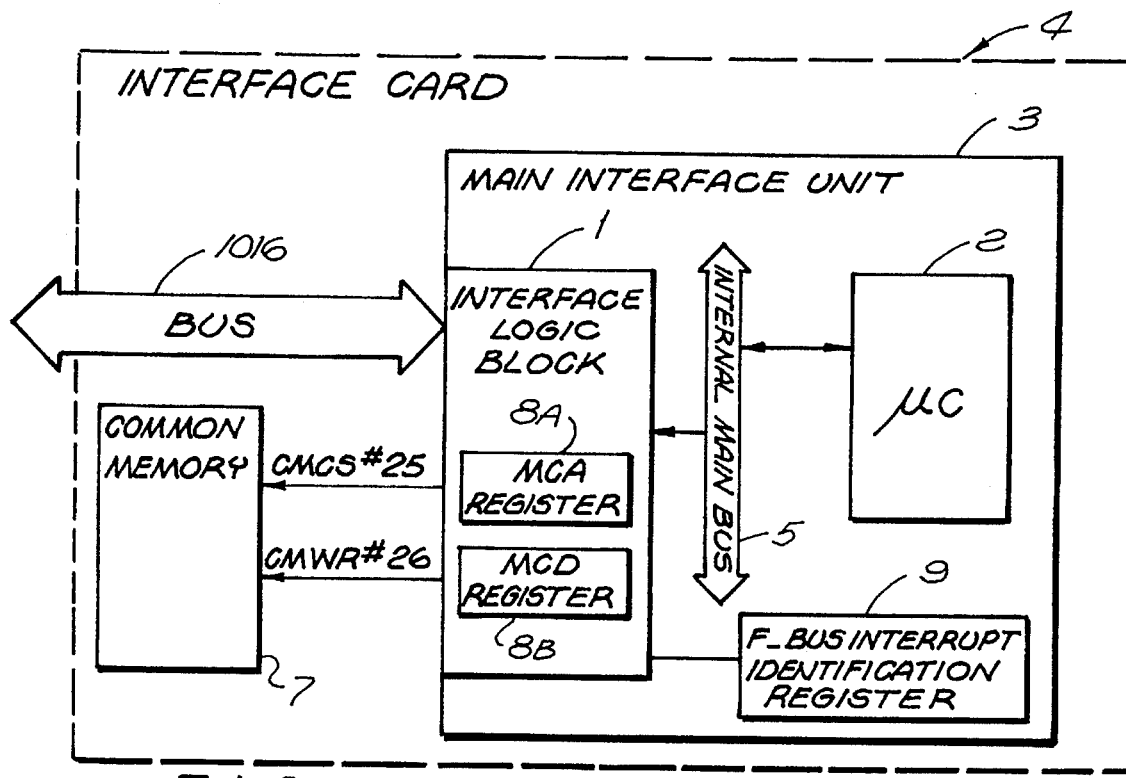
FIG. 4 presents the interface card of FIG. 2 during an internal CIS read operation.
Figure 5:
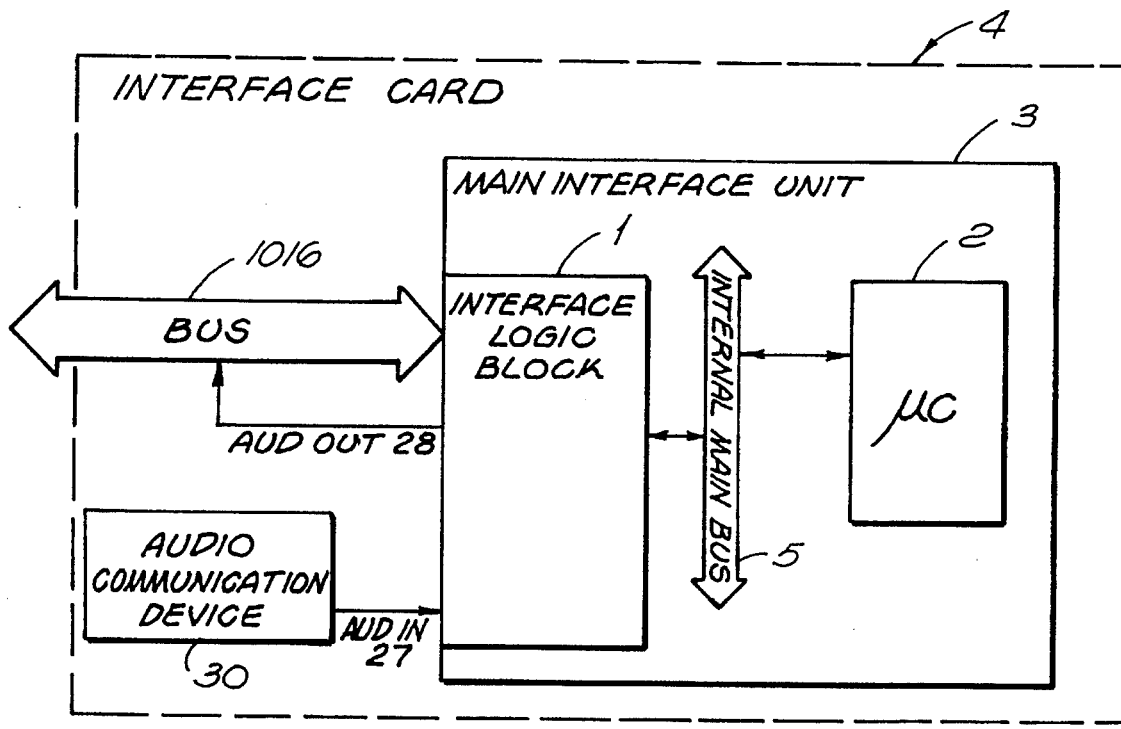
FIG. 5 presents the interface card of FIG. 2 in the audio mode.

FIGS. 3–5 show the major components of interface card 4 that are involved in a common memory mode, CIS read or audio mode operation. The components that do not contribute substantially in each of the operations are omitted from FIGS. 3–5 simply to clarify each operation.

The present invention allows a firmware engineer to choose between a common memory mode and an audio mode, and to choose between an internal CIS read and an external CIS read in the common memory mode.

(2) Common Memory Mode

FIG. 3 shows the major components that are involved in a common memory mode. Interface card 4 includes a common memory 7 which may include, but is not limited to, any or all of a flash memory, CIS bytes and other types of memory. A common memory mode operation utilizes, among other things, two external pins CMCS# 25 and CMWR# 26, several register cells and logic circuits in interface logic block 1. In a common memory mode, one may choose to perform a common memory read or common memory write operation. While microcontroller 2 can enable or disable the common memory write operation using a common memory write protect bit in ICR 90 of FIG. 11, host 1000 can enable or disable the common memory read or write operation using a host common memory access enable bit in COR 35 of FIG. 6.

(a) Common Memory Read

Continuing to refer to FIG. 3, during a common memory read, CMCS# 25 is asserted, CMWR# 26 is deasserted, and OE# 16 is asserted. In the preferred embodiment of the present invention, because all these signals are inverted, CMCS# 25 is 0, CMWR# 26 is 1, and OE# 16 is 0. During a common memory read, host 1000 can read data in common memory 7. The data is transferred from common memory 7 through a bus 6 and bus 1016 to host 1000.

(b) Common Memory Write

Still referring to FIG. 3, during a common memory write operation, OE# 16 is deasserted, CMCS# 25 is asserted, and CMWR#26 is asserted. In the preferred embodiment of the present invention, OE# 16 is a logic 1, CMCS# 25 is a logic 0, and CMWR#26 is a logic 0. In a common memory write operation, data is written to common memory 7 through bus 1016 and bus 6. It should be noted that either host 1000 or microcontroller 2 can enable or disable the common memory write operation.

(c) External CIS Read

Continuing to refer to FIG. 3, in an external CIS read, if host 1000 requests the CIS information, OE# 16 and CMCS# 25 are asserted, and CMWR# 26 is deasserted. The CIS information that resides in common memory 7 will be sent to host 1000 through bus 6 and bus 1016.

(d) Internal CIS READ

FIG. 4 illustrates an internal CIS read operation. When host 1000 requests an internal CIS read, WAIT# 21 in FIG. 2 is asserted (a logic 0), the address of the CIS bytes is stored in a memory card address (MCA) register 8A in interface logic block 1, and an interrupt is sent to microcontroller 2. One bit in a F-bus interrupt identification register 9 identifies that the source of the interrupt is for an internal CIS read. After microcontroller 2 fetches the CIS data at the requested address location within main interface unit 3, it stores the CIS data in a memory card data (MCD) register 8B. The data is then put out to bus 1016 to be sent to host 1000, and WAIT# 21 is pulled high to be deasserted.

(3) Audio Mode

FIG. 5 illustrates an audio mode operation. In the audio mode, in the preferred embodiment, the pin for CMCS# 25 is used for AudIn 27, and the pin for CMWR# 26 is used for AudOut 28. AudIn 27 is coupled to an audio communication device 30 while Audio communication device 30 is typically coupled to a modem line.

III. Registers (1) Configuration Option Register (COR)

FIGS. 6–11 and Tables 1–4 describe the registers involved in the present invention in detail. Now referring to FIG. 6, configuration option register (COR) 35 contains 8 bits in the preferred embodiment. In another embodiment, COR 35 may contain more than or less than 8 bits. COR 35 resides in interface logic block 1 in FIG. 2. COR 35 may contain various bits as described below. SRST 40 is a software reset that resets an entire chip such as main interface unit 3 except for SRST 40 bit itself and ICR 90 in FIG. 11. LvlReq 41 decides if an interrupt sent to host 1000 is a level signal (LvlReq=1) or a pulse signal (LvlReq=0).

Continuing to refer to FIG. 6, CE 42 is a card enable bit. If CE 42 is set, it changes interface card 4 from a memory card to an I/O card. HCMAEn 43 is a host common memory access enable bit. To enable CMCS# 25 or CMWR# 26 for a common memory read or common memory write, HCMAEn 43 must be set. UAMEn 44 is a UART attribute memory enable bit. When UAMEn 44 is set, it allows host 1000 to access UART registers in attribute memory space. CS1 45 and CS0 46 are COM port select bits which indicate which COM port is selected for the UART. For example, if CS1 45 is 0, and CS0 46 is 0, then the COM port at the base address of 3F8h is selected. If CS1 is 1 and CS0 is 0, then the COM port at the base address of 3E8h is selected. Table I summarizes the description of the COR bits.

TABLE 1

| Bit | Description |
| --- | --- |
| SRST | Software reset |
| LvlReq | Level Request bit to determine if the interrupt sent to the host is level (1) or pulsed (0). |
| CE | Card Enable that allows I/O access. Active high. |
| UAMEn | UART Attribute Memory Enable. Active high. |
| CS1, CS0 | COM Select indicating which COM port is selected for the UART. |
| HCMAEn | Host Common Memory Access Enable. Must be set by the host for it to use common memory (enables CMCS# and CMWR# pins for common memory.) |

(2) Card Configuration and Status Register (CCSR)

FIG. 7 illustrates a card configuration and status register (CCSR) 50 which can be written by host 1000 at any time. After writing to CCSR 50 in FIG. 7, COR 35 in FIG. 6 or PRRO 60 in FIG. 8 (PRRO 60 will be discussed later), an interrupt is sent to microcontroller 2. Microcontroller 2 performs any of the requests directed by host 1000. In the preferred embodiment, CCSR 50 contains 8 bits, and only 6 bits are utilized. In another embodiment, CCSR may contain more than or less than 8 bits and may utilize more than or less than 6 bits.

Referring to FIG. 7, Chgd 51 and SigChg 52 are standard PCMCIA signals. Chgd 51 is a "changed" bit which indicates whether one or more of PRRO 60 bits are set to 1. SigChg 52 is a signal change bit which is set or reset by host 1000 to enable or disable Chgd 51. Chgd 51 and SigChg 52 are used to detect the capacity of a battery, the status of Rdy/Bsy# 67 in FIG. 8 or some of other bits in PRRO 60. RngIndEn 53 is a ring indicate enable bit. If host 1000 enables RngIndEn 53, then STSCHG# 29 in FIG. 2 is asserted when a ring occurs. STSCHG# 29 in FIG. 2 is active under either of the two conditions, indicating that there has been a card status change. First, STSCHG# 29 can become active when CE 42 in FIG. 6 and Chgd 51 and SigChg 52 in FIG. 7 are set to 1. Second, STSCHG# 29 can become active when CE 42 of FIG. 6 is enabled, RngIndEn 53 of FIG. 7 is set, and RngInd 24 of FIG. 2 is set.

Continuing to refer to FIG. 7, AudioEn 54 is an audio enable bit. In order for an audio signal to be sent to host 1000, host 1000 has to set AudioEn 54 bit. PD 55 is a power-down bit used by host 1000 to request that interface card 4 to go into a power-down mode. During a power-down mode, all I/O access via IORD# 14 and IOWR# 15 are ignored. However, an access to COR 35 in FIG. 6, CCSR 50 in FIG. 7 or PRRO 60 in FIG. 8 is still allowed during the power-down mode. INTR 56 is an interrupt bit used to determine if an interrupt is pending (1) or not (0). The value is available whether or not the interrupts have been configured. The description of CCSR 50 bits is summarized in Table 2.

TABLE 2

| Bit | Description |
| --- | --- |
| INTR | The INTeRrupt bit is used to determine if an interrupt is pending (1) or not (0). The value is available whether or not the interrupts have been configured. |
| PD | The Power Down bit is used by the Host to request that the card go into power down mode. |
| AudioEn | Enables the audio out. |
| SigChg | Enables or disables a state-change signal from the status register. |
| Chgd | Indicates that one or more of the upper four bits of PRRO register are set. |
| RngIndEn | Ring Indicate Enable for the STSCHG# signal. Active high. |

(3) Pin Replacement Register Organization (PRRO)

Now referring to FIG. 8, pin replacement register organization (PRRO) 60 mentioned above is described in detail. The lower four bits of PRRO 60 are written by microcontroller 2 and may be read by both host 1000 and microcontroller 2. Rdy/Bsy# 67 is a ready-or-busy signal bit, indicating whether interface card 4 is ready or busy. Upon power-up, Rdy/Bsy# 67 is 0, and CE 42 in FIG. 6 is also set to 0. This causes IRQ# 20 in FIG. 2 to be 0. Microcontroller 2 has a responsibility of setting Rdy/Bsy# 67 to let host 1000 know that interface card 4 is ready to be used. The upper bits of PRRO 60 are delta bits. Any of the four bits can be set if the corresponding lower bit has changed its state. If any of the upper four bits are set, and CE 42 is set, and SigChg 52 is set, then STSCHG# 29 becomes active. Host 1000 may also write to any of the upper four bits. However, when host 1000 writes to the upper four bits, the lower four bits act as mask bits for changing the corresponding bit of the upper four bits.

(4) Memory Card Address (MCA) and Memory Card Data (MCD)

A memory card address (MCA) register 70 is shown in FIG. 9, and a memory card data (MCD) register 80 is shown in FIG. 10. When host 1000 attempts a CIS read, the address from host 1000 is automatically loaded into MCA register 70, and an interrupt is sent to microcontroller 2 in FIG. 2. In the preferred embodiment, when the upper most bit of ICR 90 in FIG. 11 or CE 42 in FIG. 6 is set, MCA register 70 is not updated, and no interrupt is sent to microcontroller 2.

Now referring to FIG. 10, MCD register 80 is a temporary storage register written by microcontroller 2 in FIG. 2 whenever host 1000 requests a read of attribute memory such as internal CIS bytes. In the preferred embodiment, if host 1000 requests a read (OE#=0), address 19 in FIG. 2 is an attribute memory address, the two highest bits (bit 9 and bit 8) of address 19 do not equal the address range selected by attribute memory range select bits of ICR 90 of FIG. 11, and the external CIS read enable bit of ICR 90 and CE 42 of FIG. 6 are inactive, then the following events occur. WAIT# 21 in FIG. 2 becomes active. Address 19 of FIG. 2 is stored in MCA register 70 in FIG. 9. An interrupt is sent to microcontroller 2. After microcontroller 2 fetches the data at the requested address 19, the data is stored in MCD register 80. The data is then put out onto bus 1016 to be sent to host 1000, and WAIT# 21 becomes inactive. Microcontroller 2 can read or write to MCD register 80 while host 1000 can only read MCD register 80.

(5) Interface Configuration Register (ICR)

FIG. 11 shows an interface configuration register (ICR) 90. In the preferred embodiment, ICR 90 is called a PCMCIA configuration register (PCR) because it is used with a PCMCIA bus, and ICR 90 contains 8 bits used to set up the host interface. In another embodiment, ICR 90 may contain more than or less than 8 bits. ECISEn 91 is an external CIS read enable bit. In the preferred embodiment, this is the highest bit of ICR 90. In another embodiment, it may not be the highest bit of ICR 90. When ECISEn 91 is set, CIS reads are done externally using OE# 16 and CMCS# 25 in FIG. 2.

In the preferred embodiment of the present invention, an internal CIS read using MCA register 70 in FIG. 9, MCD register 80 in FIG. 10 and microcontroller 2 in FIG. 2 may be performed if ECISEn 91 in FIG. 11 and CE 42 in FIG. 6 are inactive. If CE 42 is active, and ECISEn 91 is inactive, then no CIS read will be performed, and the data being sent to host 1000 is the last byte read. If ECISEn 91 is active, then all CIS reads are performed externally regardless of the value of CE 42.

RngSt 92 is a ring indicate status bit. This bit indicates the current value of a ring indicate input. CMEn# 93 is a common memory enable not bit. If CMEn# is 0, then it enables CMCS# 25 and CMWR# 26 for the common memory mode. If CMEn# 93 is 1, the pins corresponding to CMCS# 25 and CMWR# 26 are used for AudIn 27 and AudOut 28. Thus, if CMEn# 93 is asserted, a common memory access is allowed, and if CMEn# 93 is deasserted, then audio communication device 30 is connected to main interface unit 3. SWRID 94 is a software ring indicate detect bit which is written by microcontroller 2. SWRID 94 detects a software ring rather than an actual ring. ESWRI 95 is a software ring indicate enable bit. ESWRI 95 enables SWRID 94. CMWP 96 is a common memory write protect bit. If CMWP 96 is inactive (a logic 0, in the preferred embodiment), common memory writes are allowed. If, however, CMWP 96 is asserted (a logic 1, in the preferred embodiment), then the common memory write operation is prohibited, and CMWR# 26 of FIG. 2 will be inactive.

Continuing to refer to FIG. 11, AMRS1 97 and AMRS0 98 are attribute memory range select bits. AMRS1 97 and AMRS0 98 allow firmware selectable locations for CIS bytes, COR address, CCSR address and PRRO address as shown in Table 3. Referring to Table 3, when AMRS1 97 is 0, and AMRS0 98 is either 0 or 1, CIS bytes may reside in 0-FFh, COR address starts at 100 h, CCSR address starts at 102 h, and PRRO address starts at 104 h. If AMRS1 97 is 1, and AMRS0 98 is 0, CIS bytes may occupy 0–1 FFh, COR address starts at 200 h, CCSR address starts at 202 h, and PRRO address starts at 204 h. If AMRS1 97 is 1, and AMRS0 98 is 1, then CIS bytes may occupy 0–2 FFh, COR address begins at 300 h, CCSR address begins at 302 h, and PRRO address starts at 304 h. Thus, by changing the values of AMRS1 97 and AMRS0 98, the size and location of CIS bytes can be changed and are not fixed by the manufacturer.

TABLE 3

| AMRS1 | AMRS0 | CIS | COR Address | CCSR Address | PRRO Address |
|---|---|---|---|---|---|
| 0 | 0 | 0-FFH | 100h | 102h | 104h |
| 0 | 1 | 0-FFH | 100h | 102h | 104h |
| 1 | 0 | 0–1FFh | 200h | 202h | 204h |
| 1 | 1 | 0–2FFh | 300h | 302h | 304h |

If the original CIS bytes occupy 100 h, but the new CIS bytes for upgrade occupy 200 h bytes, then a user can down-load the CIS information from a disk to microcontroller 2. When the computer is booted up next time, CIS bytes will occupy 0–1 FFh. In this case, AMRS1 97 will be set to 1, and AMRS0 98 will be set to 0.

In the prior art, the size and location of CIS bytes were not changeable. Thus, if one wanted to upgrade the firmware, and the CIS bytes occupied more than the amount originally allowed, then the user had to replace the whole interface chip containing the CIS bytes. In the preferred embodiment of the present invention, such replacement is avoided as long as CIS bytes are not greater than 300 h. The description of ICR 90 bits is summarized in Table 4.

TABLE 4

| Bit | Description |
|---|---|
| RngSt | Ring Indicate Status-current value of Ring Indicate input. |
| CMEn# | Common Memory Enable# - if 0, enables CMCS# and CMWR# pins for common memory use; if 1, these 2 pins are used for audio in and audio out. |
| SWRID | Software Ring Indicate Detect - written by microcontroller. |
| ESWRI | Enable software ring indicate to StsChg# signal sent to host. |
| CMWP | Common Memory Write Protect - if 0, common memory writes are allowed; if 1, then the CMWR# pin will not go active (low). |
| AMRS1 | Attribute Memory Range Select 1. |
| AMRS0 | Attribute Memory Range Select 0. |
| ECISEn | External CIS Read Enable. If set, CIS reads are done externally through use of the CMCS#. |

Although the preferred embodiment contains two attribute memory range select bits, there may be only one such bit or more than two such bits in another embodiment. Also, the preferred embodiment provides three ranges, 0-FFh, 0–1 FFh and 0–2 FFh, for the CIS bytes. However, in another embodiment, there may be different number of ranges and different number of bits for each range. Accordingly, in another embodiment, the addresses of the COR, CCSR and PRRO may be different from the ones specified in the preferred embodiment. In addition, in another embodiment, the number of bits assigned to the addresses of the COR, CCSR and PRRO may be more than or less than 2 bits.

IV. Logic Schematic for a Common Memory Mode or Audio Mode

Figure 12:
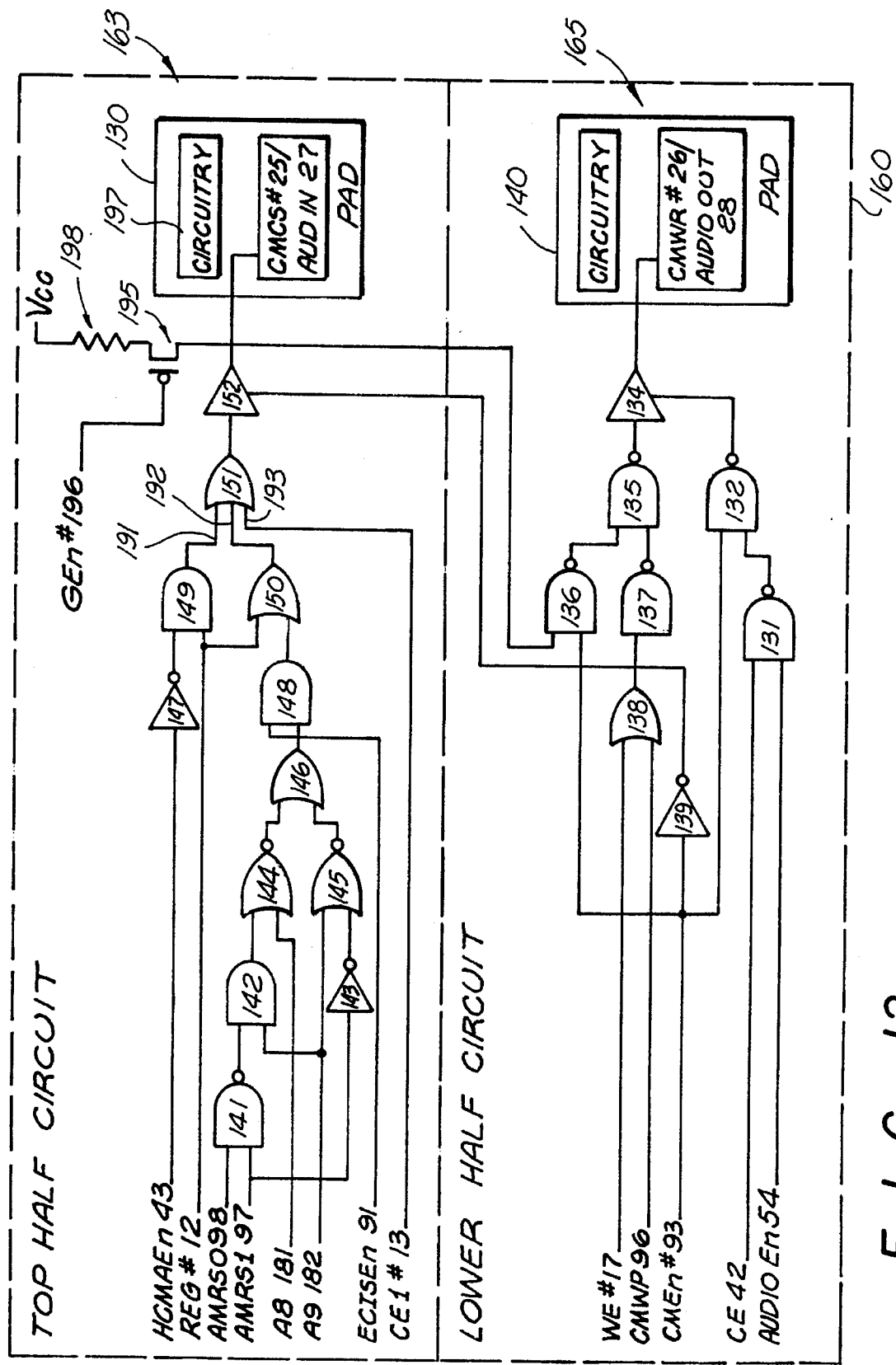
FIG. 12 presents a circuit for selecting the common memory read operation, common memory write operation, internal or external CIS read or audio mode according to the present invention.

FIG. 12 shows a logic schematic that allows a user to select a common memory read, a common memory write, an internal CIS read, an external CIS read or an audio mode. The inputs of a circuit 160 include UAMEn 43, REG# 12, AMRS0 98, AMRS1 97, A8 131 which is bit 8 of address 19 in FIG. 2, A9 132 which is bit 9 of address 19, ECISEn 91, CEi# 13, WE# 17, CMWP 96, CMEn# 93, CE 42, and AudioEn 54. Circuit 160 also includes a first pad unit 130 having an output for either CMCS# 25 or AudIn 27 and a second pad unit 140 having an output for either CMWR# 26 or AudOut 28. Pad unit 130 includes a circuitry 197 which generates, among other things, a global enable (GEn#) signal 196. GEn# 196 is used to enable a P-channel MOSFET 195 to pull up CMCS# 25 or AudIn 27 to Vcc (high). Circuit 160 further includes a resistor 198, which is a 10K ohm diffusion resistor in the preferred embodiment. The schematic shown in FIG. 12 is the preferred embodiment of the present invention. However, there are many other ways of connecting logic gates while accomplishing the same functions. It should be noted that in the preferred embodiment, an active signal is a logic 1 if the signal is non-inverted and is a logic 0 if the signal is inverted, and an inactive signal is a logic 0 if the signal is non-inverted and is a logic 1 if the signal is inverted. The logic values according to the preferred embodiment of the present invention are specified in parentheses in the following discussion.

(1) Common Memory (a) Common Memory Read

Continuing to refer to FIG. 12, during a common memory read operation, CMCS# 25 is active, and CMWR# 26 is inactive. To make CMCS# 25 active, HCMAEn 43 is active (1), REG# 12 is inactive (1), CEi# 13 is active (0), and CMEn# 93 is active (0). In the preferred embodiment, because HCMAEn 43 is 1, the output of an inverter 147 is 0, and the output of a gate 149 is 0. In the preferred embodiment, because REG# 12 is 1, the output of a NOR gate 150 is 0 regardless of the value of the other input into gate 150. Because CEi# 13 is 0, an OR gate 151 produces an output 0 because all the inputs to gate 151 are 0s. Because CMEn# 93 is 0, a tri state driver 152 is enabled, and the output of 151, which is 0, is transmitted to pad unit 130. Thus, CMCS#25 is 0, enabling CMCS# 25.

In the lower half circuit 165, WE# 17 is inactive (1), and CMEn# 93 is active (0) to disable CMWR# 26 (1). Because CMEn# 93 is 0, a gate 132 outputs 1, enabling a tri state driver 134. Because the output of tri state driver 152 is 0, the output of a gate 136 is 1, and the output of a gate 135 depends on the output of a gate 137. Since WE# 17 is 1, a gate 138 outputs 1, and gate 137 outputs 0. As a result, gate 135 outputs 1, and since tri state driver 134 is enabled, CMWR# 26 is 1. The common memory read operation does not care about the values in AMRS0 98, AMRS1 97, A8 181, A9 182, ECISEn 91, CMWP 96, CE 42 and AudioEn 54.

(b) Common Memory Write

During a common memory write operation, CMCS# 25 is active, and CMWR# 26 is also active. To enable CMCS# 25, the top half circuit 163 operates in the same way as in the common memory read operation. Thus, HCMAEn 43 is active, REG# 12 is inactive, CE1 #13 is active, CMEn# 93 is active, and CMCS# 25 is enabled. The common memory write operation does not care about the values in AMRS0 98, AMRS1 97, A8 181, A9 182, and ECISEn 91.

The inputs of the lower half circuit 165 have the following values: WE# 17 is active (0), CMWP 96 is inactive (0), and CMEn#93 is active (0). Tri state driver 134 is enabled because CMEn#93 is active. The output of gate 136 is 1, the output of gate 138 is 0, and the output of gate 137 is 1. Thus, the output of gate 135 is 0. Because tri state driver 134 is enabled, the output of gate 135, which is 0, is transmitted to pad unit 140. Thus, CMWR# 26 is 0, enabling CMWR# 26. The common memory write operation does not care about the values in CE 42 and AudioEn 54.

(c) Internal CIS Read

Continuing to refer to FIG. 12, during an internal CIS read, circuit 160 is disabled. ECISEn 91 is inactive (0), and CE 42 is inactive (0). In addition, the PCMCIA signals REG# 12 and CEi# 13 are active (0), and WE# 17 is inactive (1). Microcontroller 2 performs others functions to carry out the internal CIS read, as discussed earlier.

(d) External CIS Read

Still referring to FIG. 12, during an external CIS read, CMCS# 25 becomes active (0), and CMWR# 26 becomes inactive (1). In top half circuit 163, ECISEn 91 is active (1), REG# 12 is active (0), and CEi# 13 is active (0). In the preferred embodiment, because REG# 12 is 0, an input signal 191 to gate 151 is 0. Because CEI# 13 is 0, an input signal 193 is also 0. For an input signal 192 to be 0, the output of a gate 148 must be 1, which means that the output of a gate 146 must be 1 since ECISEn 91 is already 1. Gates 141, 142, 144, 145 and 146 and an inverter 143 ensure that the output of gate 146 is 1 only if the value of AMRS0 98 and AMRS1 97 is greater than the value of A8 181 and A9 182.

For example, if AMRS1 97 is 1, AMRS0 98 is 1, A9 182 is 1, and A8 181 is 0, then the output of gate 146 is 1 because the value of AMRS197 and AMRS098, which is 11, is greater than the value of A9 182 and A8 181, which is 10. However, if AMRS1 97 is a 1, AMRS0 98 is 0, A9 182 is 1, and A8 181 is 0, then the output of 146 is 0 because the value of AMRS1 and AMRS0, which is 10, is not greater than the value of A9 182 and A8 181, which is 10. This is to ensure that the requested CIS addresses are below the boundary limit set by AMRS1 97 and AMRS0 98.

The external CIS read does not care about the values of HCMAEn 43, CMWP 96, CE 42 and AudioEn 54. The lower half circuit 165 operates in the same way as in the common memory read operation.

(2) Audio

Continuing to refer to FIG. 12, during an audio mode, to ensure both AudIn 27 and AudOut 28 are active (1), AudioEn 54 is active (1), CE 42 is active (1), and CMEn# 93 is inactive (1). The audio mode does not care about the values of the other input signals. Because CMEn# 93 is 1, the output of an inverter 139 is 0, disabling tri state driver 152. Thus, the logic gates to the left of tri state driver 152 do not affect pad unit 130. Because GEn# 196 is active (0), MOSFET 195 is on, and the output of pad unit 130 is pulled high. Thus, AudIn 27 is 1, enabling AudIn 27. It should be noted that MOSFET 195 can be another type of transistors including, but not limited to, a BJT or a JFET. Because CE 42 is 1, and AudioEn 54 is 1, tri state drive 134 is enabled. Because AudIn 27 is 1, and CMEn# 93 is 1, an output of gate 136 is 0, and an output of gate 135 is 1. As a result, AudOut 28 becomes 1. Thus, during the audio mode, both AudIn 27 and AudOut 28 are active.

V. Block Diagram of an Interface Logic Block

FIG. 13 shows a block diagram of interface logic block 1 having COR 35, CCSR 50, PRRO 60, MCA 70, MCD 80, ICR 90, circuit 160, CMCS# 25 and CMWR#26. These components of interface logic block 1 have been discussed in detail in this application using FIGS. 4–12.

VI. Sequence of Operation

When interface card 4 is first plugged in to communicate with host 1000, host 1000 detects that there is a card and applies power to interface card 4, and the following events occur. While interface card 4 is powered up, Rdy/Bsy# 67 in FIG. 8 is disabled (or 0 in the preferred embodiment) to perform the start-up routine. During the start-up routine, microcontroller 2 decides whether interface card 4 is to be used in an audio mode or in a common memory mode. Microcontroller 2 also decides whether an internal or external CIS read is to be performed. Based on the firmware, microcontroller 2 writes various data to ICR 90 in FIG. 11. AMRS1 97 and AMRS0 98 in FIG. 11 are written at this time to select the memory range. When microcontroller 2 is ready, Rdy/Bsy# 67 becomes enabled (or 1 in the preferred embodiment), and host 1000 reads the CIS bytes. If host 1000 is performing an internal CIS read, and CE 42 is set, then no further CIS reads will happen. If, however, CE 42 is inactive (0), then CIS reads are not allowed. After host 1000 finishes CIS reads, host 1000 is ready for other operations including writing to COR 35.

While the present invention has been particularly described with reference to FIGS. 1–13 and Tables 1–4, it should be understood that the Figures are for illustration only and should not be taken as limiting the scope of the invention. Many changes and modifications may be made to the invention, by one having ordinary skill in the art, without departing from the spirit and scope of the invention as disclosed herein.

What is claimed is:

1. An interface card having an interface logic block adapted for interfacing a peripheral device with a computer host and for selecting between a common memory mode to communicate with an on-board common memory and an audio mode to communicate with an on-board audio communication device, said interface logic block comprising:

a plurality of registers including at least one register having a plurality of attribute memory range select (AMRS) bits which can selectively alter address locations of card information structure (CIS) bytes containing information about the interface card;

at least a first external pin coupled to said common memory and said audio communication device, said first external pin provides a common memory signal to said common memory when said common memory mode is selected by at least one of said plurality of registers and provides an audio signal to said audio communication device when said audio mode is selected by at least one of said plurality of registers; and a logic circuit coupled to said plurality of registers and to said first external pin.

2. The interface card according to claim 1, wherein said interface logic block further includes a second external pin coupled to said logic circuit, said second external pin provides a common memory write (CMWR) signal when said common memory mode is selected and provides an audio-out (AndOut) signal when said audio mode is selected.

3. The interface card according to claim 2 further including an internal bus coupled to said interface logic block and a microcontroller coupled to said internal bus, wherein said microcontroller selects between said common memory mode and said audio mode.

4. The interface card according to claim 3 wherein in said common memory mode featuring a common memory read operation and a common memory write operation, said microcontroller enables and disables said common memory write operation.

5. The interface card according to claim 4 wherein said computer host enables and disables said common memory read and write operations.

6. The interface card according to claim 5 wherein said plurality of registers includes a first register, a second register and a third register that collectively configure said interface card.

7. The interface card according to claim 6 wherein said first register includes:

a card enable (CE) bit that allows an I/O access into the interface card;

a host common memory access enable (HCMAEn) bit that allows said computer host to enable and disable said common memory read and write operations; and a universal asynchronous receiver and transmitter (UART) attribute memory enable (UAMEn) bit that allows said computer host to access UART registers in attribute memory space.

8. The interface card according to claim 7 wherein said second register includes:

an external card information structure read enable (ECISEn) bit that allows an external card information structure (CIS) read;

a common memory enable (CME) bit that enables said common memory mode;

a common memory write protect (CMWP) bit that prohibits and allows said common memory write operation; and said plurality of AMRS bits that further select addresses of said first register, said third register and a fourth register.

9. The interface card according to claim 8 wherein said third register includes:

a ring indicate enable (RngIndEn) bit that enables a ring indicate (RngInd) signal so that when a ring occurs, said RngInd signal is set; and an audio enable (AudioEn) bit that enables said audio output (AndOut) signal during said audio mode.

10. The interface card according to claim 9 wherein when said ECISEn bit is set, a CIS read is performed externally, and when said ECISEn bit is not set, a CIS read is performed internally;

when said CMEn bit is set, said interface card is in said common memory mode, and when said CMEn bit is not set, said interface card is in said audio mode; and when said CMWP bit is set, said common memory write operation is prohibited, and when said CMWP bit is not set, said common memory write operation is allowed.

11. An interface card including an internal bus, a microcontroller coupled to the internal bus, and an interface logic block coupled to the internal bus, for interfacing a peripheral device with a computer host and for selecting between a common memory mode to communicate with an on-board common memory and an audio mode to communicate with an on-board audio communication device, said interface logic block comprising:

(i) a plurality of registers including a first register, a second register, and a third register, said registers are used to configure the interface card, wherein said second register includes an external card information structure read enable (ECISEn) bit that allows an external card information structure (CIS) read, a common memory enable (CMEn) bit that enables said common memory mode, a common memory write protect (CMWP) bit that prohibits and allows said common memory write operation, when said CMWP bit is set, said common memory write operation is prohibited, and when said CMWP bit is not set, said common memory write operation is allowed, and a plurality of attribute memory range select (AMRS) bits that select attribute memory ranges for CIS bytes and addresses of said first register, said third register and a fourth register, wherein said AMRS bits allow firmware selectable locations of said CIS bytes and addresses of said first register, said third register and said fourth register so that said CIS bytes are upgradable;

(ii) a logic circuit coupled to said plurality of registers;

(iii) a first external pin coupled to said logic circuit, said first external pin provides a common memory chip select (CMCS) signal to the common memory when said common memory mode is selected by at least one of said plurality of registers and provides an audio-in (AudIn) signal to an audio communication device when said audio mode is selected by at least one of said plurality of registers; and (iv) a second external pin coupled to said logic circuit, said second external pin provides a common memory write (CMWR) signal to the common memory when said common memory mode is selected and provides an audio-out (AudOut) signal to the audio communication device when said audio mode is selected.

12. The interface card according to claim 11 further including:

a second card enable (CE1) signal which enables said interface card, said CE1 signal received from the computer host, a register select and I/O enable (REG) signal which selects between attribute memory and I/O space, said REG signal received from the computer host, an address signal including a plurality of data address bits, said address signal received from the computer host, a write enable (WE) signal which enables a write operation, said WE signal received from the computer host, and an output enable (OE) signal which enables a read operation.

13. The interface card according to claim 12 wherein said logic circuit includes:

at least two tri state drivers;

a first pad for one of said CMCS and AudIn signals, said first pad coupled to a first one of said tri state drivers and to a second one of said second tri state drivers through a plurality of gates;

a second pad for one of said CMWR and AudOut signals, said second pad coupled to said second tri state driver;

a transistor coupled to said first pad and said first tri state driver, said transistor pulls said first pad to Vcc;

a second logic circuit coupled to said second tri state driver and receives said CMEn bit, CE bit and AudioEn bit as input and in response enables and disables said second tri state driver; and a third logic circuit coupled to said first tri state driver through a fourth logic circuit and receives said AMRS bits and upper data address bits as inputs, said third logic circuit determines whether said AMRS bits are greater than the upper data address bits;

said fourth logic circuit coupled to said first tri state driver and receives said HCMAEn bit, said REG signal, said ECISEn bit an CE1 signal as inputs;

a fifth logic circuit coupled to said first and second tri state drivers and receives said WE signal, said CMWP bit and said CMEn bit as inputs, wherein said CMEn bit enables and disables said first tri state driver.

14. The interface card according to claim 12 wherein during said common memory read operation, said HCMAEn bit is active, said REG signal is inactive, said CE1 signal is active, and WE is inactive so that said CMCS signal is active.

15. The interface card according to claim 14 wherein during said common memory write operation, said HCMAEn bit is active, said REG signal is inactive, said CE1 signal is active, said WE signal is active, said CMWP bit is inactive, and said CMEn bit is active so that said CMCS signal and CMWR signal are active.

16. The interface card according to claim 15 wherein while in said common memory mode, one of said internal CIS read and said external CIS read is performed.

17. The interface card according to claim 16 wherein in said external CIS read, REG signal is active, said ECISEn bit is active, said CE1 signal is active, WE signal is inactive, said CMEn signal is active, and said AMRS bits are greater than the upper data address bits so that said CMCS signal is active.

18. The interface card according to claim 17 further including an interrupt identification (II) register;

wherein said interface logic block further includes a memory card address (MCA) register and a memory card data (MCD) register;

wherein during said internal CIS read,
a wait signal become active,
said data address bits are loaded into said MCA register,
an interrupt is sent to said microcontroller to fetch data at an address corresponding to said data address bits,
the data is stored in said MCD register,
the data is sent to said computer host, and
the wait signal becomes inactive;

wherein said microcontroller reads and writes to said MCD register, and said computer host reads said MCD register.

19. The interface card according to claim 18 wherein in said audio mode, said CMEn bit is inactive, said CE bit is active, and said AudioEn bit is active so that said AudIn signal is active, and said AudOut signal is active.

20. A computer system comprising:

a main bus;

a computer host coupled to said main bus; and an interface card having an interface logic block which interfaces a peripheral device with said computer host through said main bus and selects between a common memory mode and an audio mode, said interface logic block comprising:

a plurality of registers, said plurality of registers includes at least one register including
an external card information structure read enable (ECISEn) bit that allows an external card information structure (CIS) read,
a common memory enable (CMEn) bit that enables said common memory mode,
a common memory write protect (CMWP) bit that controls said common memory write operation, and
a plurality of attributable memory range select (AMRS) bits that can selectively alter address locations reserved for card information structure (CIS) bytes, a first external pin coupled to a common memory in order to provide a common memory chip select (CMCS) signal to said common memory when said common memory mode is selected by at least one of said plurality of registers and coupled to an audio communication device in order to provide an audio-in (AudIn)

signal to said audio communication device when said audio mode is selected by at least one of said plurality of registers, a logic circuit coupled to said plurality of registers and said first external pin, and a second external pin coupled to said logic circuit, said second external pin provides a common memory write (CMWR) signal when said common memory mode is selected and provides an audio-out (AudOut) signal when said audio mode is selected.

21. An interface card comprising:

an interface logic block which interfaces a peripheral device with a computer host via a bus, said interface logic block includes an interface configuration register (ICR) having at least one attribute memory range select (AMRS) bit in order to alter address locations of card information service (CIS) bytes which contain information pertaining to the interface card, a configuration option register (COR), a card configuration and status register (CCSR), and a pin replacement register organization (PRRO), wherein address locations of said COR, CCSR and PRRO can be altered by said at least one AMRS bit.

22. An interface card having an interface logic block for interfacing a peripheral device with a computer host, said interface logic block selects between a common memory mode and an audio mode, said interface logic block comprising:

at least two external pins, one of said at least two external pins is used to select between said common memory mode and said audio mode, said at least two external pins are coupled to a circuit, wherein in said common memory mode, the one of said at least two external pins is reserved for a common memory chip select (CMCS) signal, and another of said at least two external pins is reserved for a common memory write (CMWR) signal, and wherein in said audio mode, the one of said at least two external pins is reserved for an audio-in (AudIn) signal, and another of said at least two external pins is reserved for an audio-out (AudOut) signal; and a first, second, third and fourth registers coupled to said circuit and are used to configure said interface card, said second register has at least one bit which selectively adjusts address locations for card information structure (CIS) bytes, at said first register, at said third register and at said fourth register.

* * * * *

UNITED STATES PATENT AND TRADEMARK OFFICE
CERTIFICATE OF CORRECTION

PATENT NO. : 5,572,683
DATED : November 5, 1996
INVENTOR(S) : Epolite et al.

It is certified that error appears in the above-indentified patent and that said Letters Patent is hereby corrected as shown below:

Title page,

In the Abstract at [57] at line 8 insert --but is not limited to,-- following "has," and prior to "(a)"

In the Abstract at [57] at line 17 delete "further include" and insert --of the interface logic block include, but are not limited to,--

In column 4 at line 20 delete "bas" and insert --bus--

In column 4 at line 32 delete "CEi#" and insert --CE1#--

In column 4 at line 51 delete "CEi#" and insert --CE1#--

In column 4 at line 53 delete "CEi#" and insert --CE1#--

In column 5 at line 49 delete "time" and insert --the--

In column 6 at line 2 delete "unlit" and insert --unit--

UNITED STATES PATENT AND TRADEMARK OFFICE
CERTIFICATE OF CORRECTION

PATENT NO. : 5,572,683
DATED : November 5, 1996
INVENTOR(S) : Epolite et al.

It is certified that error appears in the above-indentified patent and that said Letters Patent is hereby corrected as shown below:

In column 7 at lines 30-31 delete "Table I" and insert --Table 1--

In column 10 in Table 3 delete both occurences of "0-FFH" and insert --0-FFh--

In column 11 at line 1 delete "CEi#" and insert --CE1#--

In column 11 at line 25 delete "CEi#" and insert --CE1#--

In column 11 at line 31 delete "CEi#" and insert --CE1#--

In column 12 at line 5 delete "CEi#" and insert --CE1#--

In column 12 at line 12 delete "CEi#" and insert --CE1#--

In column 12 at line 14 delete "CEi#" and insert --CE1#--

UNITED STATES PATENT AND TRADEMARK OFFICE
CERTIFICATE OF CORRECTION

PATENT NO. : 5,572,683
DATED : November 5, 1996
INVENTOR(S) : Epolite et al.

It is certified that error appears in the above-indentified patent and that said Letters Patent is hereby corrected as shown below:

In column 12 at line 36 delete "(2) Audio" and insert --(2) Audio Mode--

In column 13 at line 49 delete "(AndOut)" and insert --(AudOut)--

In column 14 at line 17 delete "(CME)" and insert --(CMEn)--

Signed and Sealed this

Twentieth Day of May, 1997

Attest:

BRUCE LEHMAN

*Attesting Officer*     *Commissioner of Patents and Trademarks*